Dec. 9, 1952 D. L. HINGS 2,621,288
NOISE NEUTRALIZING DEMODULATOR
Filed April 6, 1948 2 SHEETS—SHEET 1

INVENTOR.
DONALD L. HINGS
BY Woodling and Krost
Attys

WITNESS
Louis V. Granger

Dec. 9, 1952 D. L. HINGS 2,621,288

NOISE NEUTRALIZING DEMODULATOR

Filed April 6, 1948 2 SHEETS—SHEET 2

INVENTOR.
DONALD L. HINGS
BY
Woodling and Krost
Attys

WITNESS
Louis V. Granger

Patented Dec. 9, 1952 2,621,288

UNITED STATES PATENT OFFICE 2,621,288

NOISE NEUTRALIZING DEMODULATOR

Donald L. Hings, Vancouver, British Columbia, Canada

Application April 6, 1948, Serial No. 19,247

11 Claims. (Cl. 250—20)

My invention relates in general to radio circuits for the elimination of interference noise and in particular to converter or detector systems having noise eliminator circuits.

An object of my invention is to provide an improved carrier wave detection system and more specifically to the demodulation of only the intelligence on a carrier wave having interference wave energy superimposed.

Another object of my invention is to prevent portions of the carrier wave energy being rendered undetectable from impulse wave shock.

Another object of my invention is to provide increased selectivity in a carrier wave amplifier without materially increasing the length of the oscillatory train caused by high amplitude shock.

A still further object of my invention is to obtain an audio-voltage free from interference wave energy by obtaining energy from the sidebands outside the intelligence sidebands and inverting and applying this energy to cancel or neutralize the interference wave energy on the carrier.

Other objects and a fuller understand of my invention may be had by referring to the following description and claims, taken in conjunction with the accompanying drawing, in which:

Figure 1:
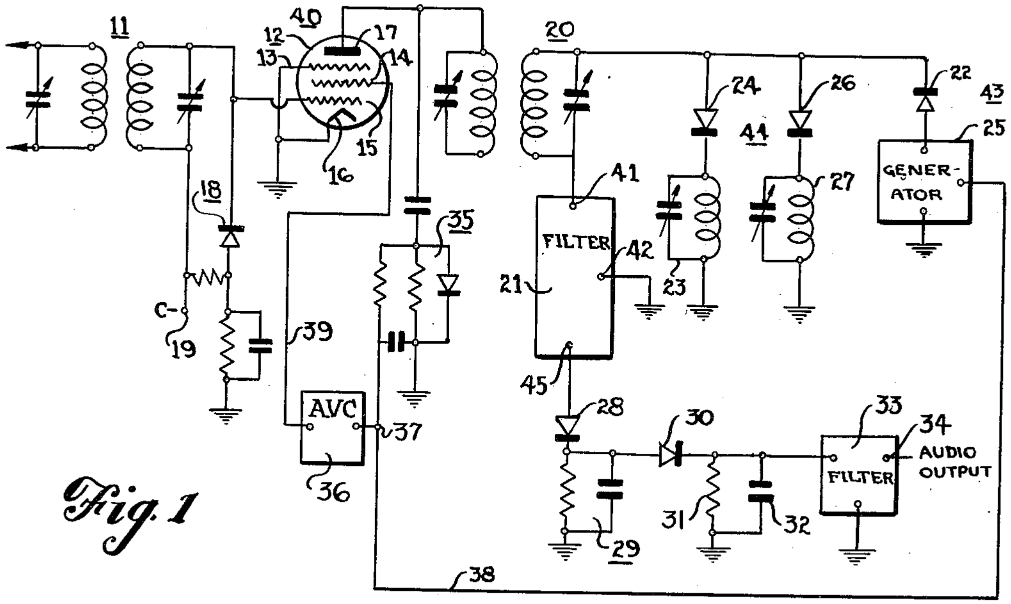
Figure 1 is a schematic diagram of the preferred embodiment of my invention.

This application is an improvement on my application Serial 772,509, filed September 6, 1947, entitled, "Demodulation System." The improvements in this invention are shown in Figure 1 wherein this circuit is adapted to operate from a source of intelligence modulated first carrier wave having superimposed thereon high peaks of interference. Such a source may be, as shown in Figure 1, an I. F. transformer 11 for applying such first carrier wave to an amplifier stage 40. This amplifier stage 40 includes in general a thermionic tube shown as an I. F. amplifier tube 12. This tube 12 has a cathode 16, control, screen and suppressor grids 15, 14 and 13 respectively, and an anode 17. An improved feature of my invention is the provision of some form of a limiter to prevent high positive peaks of interference from saturating the tube 12. In my invention I show a diode circuit 18 for shorting or by-passing to ground these peaks of interference exceeding a given value.

A terminal 19 is provided at the lower end of the secondary of the I. F. transformer 11 for applying thereat a bias potential and providing a grid-cathode return path which grid-cathode return path is, for the best operation of my circuit, of low D. C. impedance.

The amplification of this amplifier stage 40 is preferably controlled by some form of A. V. C. action. I show a first A. V. C. network 35 deriving a voltage from the anode 17 for obtaining at the terminal 37 an A. V. C. voltage adapted to control the gain of the amplifier tube 12. An A. V. C. circuit 36 is used to obtain the correct polarity and degree of voltage required for this automatic gain control which may be applied to the screen grid 14 or, by obvious modification, may be applied to the amplifier tube 12 in other well-known manners, which should not materially increase the grid-cathode return path impedance.

The output of this amplifier stage 40 is applied to a coupling means which may be in the form of an I. F. transformer with the secondary thereof comprising a first carrier input 20. A low pass filter 21 having two input terminals 41 and 42 is adapted to be connected in series with this first carrier input 20. In this preferred embodiment, I show this second input terminal 42 as being connected to ground. I next provide some form of amplitude discriminating means connected across this series combination; and I prefer to show such amplitude discriminating first circuit means 43 in the form of a periodic or varying voltage which I term a source of second carrier waves and a unilateral current passing device, shown as a first rectifier 22. I show a generator 25 for producing this second carrier wave as being connected in series with this first rectifier 22 to comprise this first circuit means 43, which is connected in parallel with the series combination of the first carrier input 20 and the input terminals 41 and 42 of the low pass filter 21. Also provided in my system is a second circuit means 44 which performs the function of frequency discrimination and, in this preferred embodiment, is shown as being a unidirectional path for passing current in the opposite direction from said first circuit means relative to said first carrier input 20. This second circuit means 44 in this improvement is shown as including two parallel paths, one of which includes a second rectifier 24 and a first parallel resonant circuit 23, and the other including a third rectifier 26 and a second parallel resonant circuit 27. These second and third rectifiers 24 and 26 accomplish the unidirectional passage of current in said second circuit means 44. The lower ends of the first and second parallel resonant circuits 23 and 27 are connected to ground to complete the circuit. The low pass filter 21, which may be designated as a first carrier wave filter for removing this first carrier wave, has an output terminal 45 for producing an output voltage relative to ground or the terminal 42. The output of this low pass filter 21 is applied to a load 29 and a detector 28. This detector 28 must be connected in the same sense as the second and third rectifiers 24 and 26 with respect to ground. Thus the detector 28 and the load 29 are effectively connected in series across the output terminals 45 and 42 of the low pass filter 21. The energy from the load 29 is next applied through an isolating section or second load including a parallel combination of a resistor 31 and a condenser 32 to ground. The isolating rectifier 30 and its load 31—32 must be connected in the same sense relative to ground as the detector 28 and its load 29.

The energy across the second load 31—32 is thereupon applied to a second carrier filter 33. This second carrier filter 33 is designed to remove the second carrier wave obtained from the generator 25 and thereupon deliver to an audio-output terminal 34 an audio-voltage or other voltage corresponding to the intelligence on the carrier wave which is substantially free from any interference.

The A. V. C. voltage obtained at the terminal 37 may be used to control through a lead 38, the amplitude of the second carrier wave generated by the generator 25. By thus providing A. V. C. control on both the generator 25 and the I. F. input or first carrier input 20, a fairly constant ratio of first carrier wave to second carrier wave amplitude is maintained.

*Operation*

Figure 2:
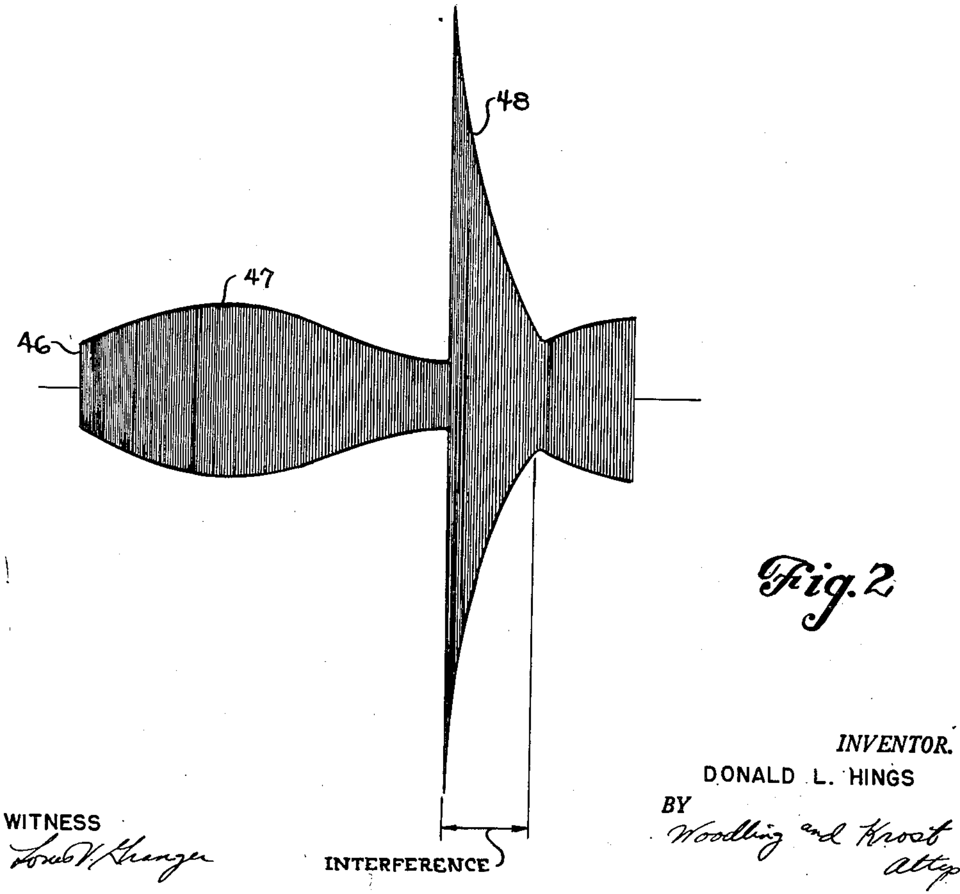
Figure 2 is a graph of the carrier wave input voltage with high interference peaks superimposed thereon.

In the operation of my circuit, the diode circuit 18 is used to limit any spurious or high positive peaks of interference which would normally saturate the amplifier tube 12. Such a first carrier voltage with interference peaks superimposed thereon may be such as is shown in Figure 2. These high positive peaks are bypassed to ground through the diode circuit 18 and thus are not applied to the control grid 14 which would otherwise saturate the tube 12. The first carrier wave that is thus applied to the amplifier stage 40 has these positive peaks of interference limited to a value which the tube 12 can amplify without distortion. This amplified and limited first carrier wave is thus applied at the first carrier input 20.

Figures 3, 4, 5, 6, 7, 8:
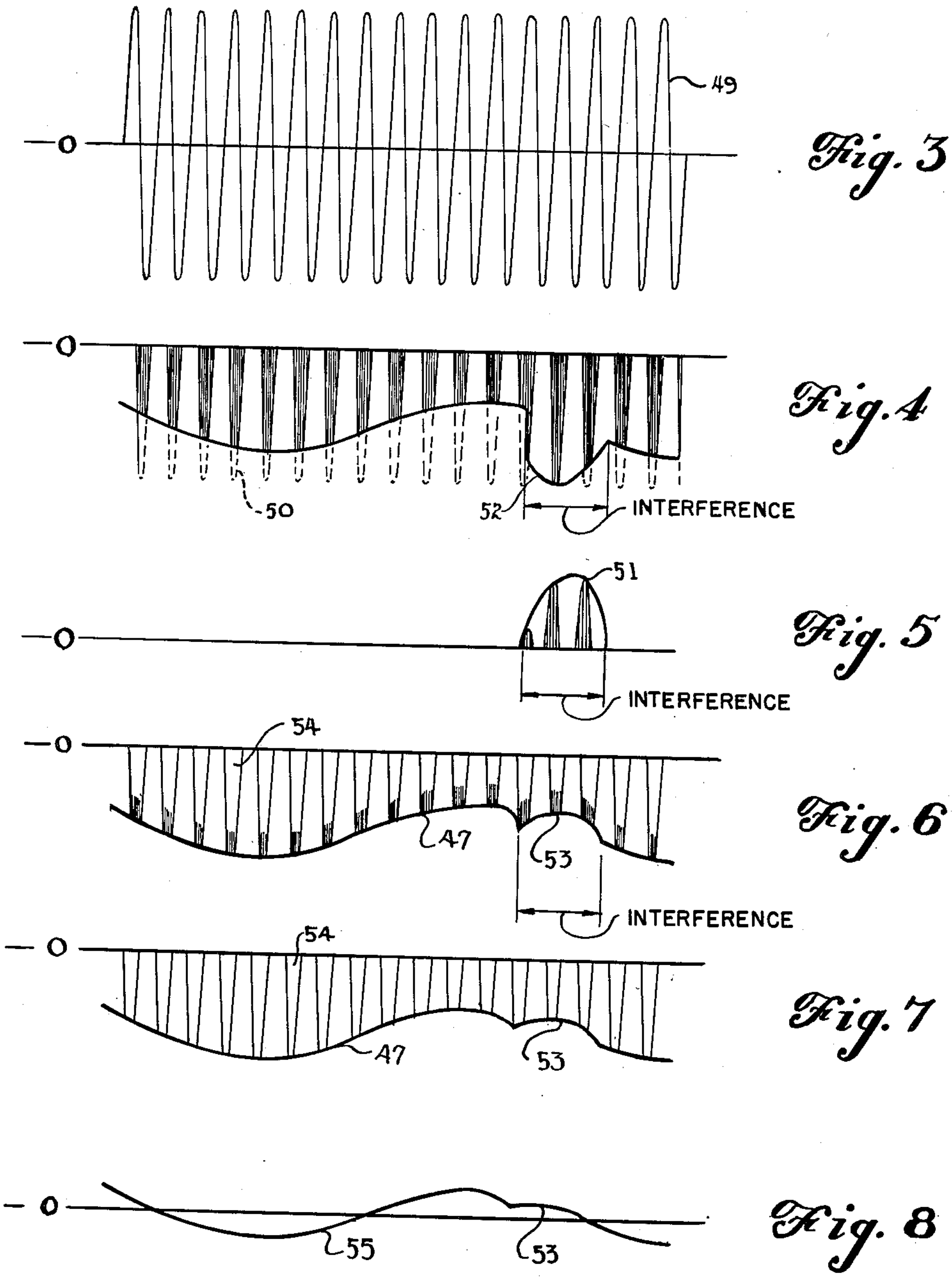
Figure 3 is a graph of the second carrier voltage used as a control of the first carrier wave.
Figure 4 is a graph of the voltages theoretically obtainable across the first carrier filter input terminals to describe one portion of the operation.
Figure 5 is a graph of a neutralizing voltage theoretically obtainable across the first carrier input terminals used to describe another portion of the operation of my circuit.
Figure 6 is a graph of the actual voltage obtainable across the input terminals of the first carrier filter.
Figure 7 is a graph of the voltages obtainable on the detector load.
Figure 8 is a graph of the audio-output voltage of my system.

The first circuit means 43 which has been described as an amplitude discriminating means uses the voltage of the second carrier wave 49 to accomplish a gating function. The second carrier wave 49 may be as shown in Figure 3. This second carrier wave is arranged to be maintained at an amplitude greater than the maximum amplitude of the modulation or intelligence on the first carrier input 20. Such a ratio of first carrier wave amplitude to second carrier wave amplitude may be accomplished by the A. V. C. network 35 and the A. V. C. circuit 36. This A. V. C. voltage may be used to control either one or both of the amplifier stage 40 and the second carrier wave generator 25. By virtue of the second carrier wave having an amplitude greater than the first carrier wave, this gating function is accomplished during half cycles of the second carrier wave. The second carrier wave thus permits a voltage to appear across the input terminals 41 and 42 of the first carrier filter 21 during half cycles of the second carrier wave which will be during positive half cycles of the second carrier wave for polarity of the rectifiers as shown in Figure 1, since the input terminal of the low pass filter 21 presents a capacitive load.

The following theory is offered to help in the understanding of the operation of my circuit. This operation can be shown by considering the first carrier wave input 20, such as shown in Figure 2 as being composed of a modulated first carrier wave 46 with a modulation component 47 and having superimposed thereon a high interference peak 48.

To explain the operation, assume that the parallel resonant circuits 23 and 27 are short circuited. Under such condtions, conduction through the second circuit means 44 would be unimpeded; whereas, conduction through the first circuit means 43 would only result at the instant that the first carrier voltage would be of a higher amplitude than the second carrier voltage. During such time, the net voltage remaining on the input of the low pass filter 21 would be gated by the second carrier and limited to a maximum amplitude of the amplitude of the second carrier, as shown in Figure 4.

The dotted lines 50 in Figure 4 represent the maximum instantaneous voltage which is permitted to appear on the first carrier filter input terminals 41 and 42. Assume that the short circuit is to be removed from the tuned circuits 23 and 27, and these two circuits tuned respectively to each side of the first carrier frequency and sufficiently displaced so as to present low impedance to the intelligence sidebands; the effect of these tuned circuits will thus be negligible so far as the intelligence modulation is concerned. However, insofar as components of the interference are concerned which are outside of the intelligence sidebands, the tuned circuits 23 and 27 present a very high impedance. The effect is to prevent conduction of these interference frequencies through the second circuit means 44; however, conduction of these frequencies is permitted through the first circuit means 43, restricted only by the amplitude discrimination accomplished by the second carrier voltage. The result of the current flow through this first circuit means 43 is to impose a net neutralizing voltage 51 on the input terminals of the first carrier filter 21 which is of opposite polarity to that shown in Figure 4. This neutralizing voltage 51 will be such as shown in Figure 5. The voltage shown in Figures 4 and 5 do not appear individually on the input terminals of the first carrier filter 21 but rather combine instantaneously to result in a voltage such as that shown in Figure 6. It can now be seen that the part of the high interference peaks 48 which remained in Figure 4 as a limited interference peak 52 has been neutralized by this neutralizing voltage 51 resulting in a portion 53 of the modulation component 47 being somewhat deformed but substantially free from interference. Thus the action of the amplitude discriminating and frequency discriminating circuit means 43 and 44 may be considered as preventing portions 53 of the carrier wave energy from being rendered undetectable from impulse wave shock of the interference peaks 48.

It is obvious that with the detector 28 being connected in the proper polarity, the resultant voltage on the load 29 will be such as shown in Figure 7, the first carrier component having been removed by the first carrier filter 21. This load output voltage 54, as shown in Figure 7, can be seen to have an amplitude corresponding to the modulation component 47 which appeared on the first carrier input 20 substantially free from the high interference peaks 48 but showing the gating action of the second carrier wave 49. It remains to remove the second carrier component in this voltage wave 54 by means of the second carrier filter 33 presenting on the output terminals 34 and ground an audio-output voltage 55 shown in Figure 8, which is a voltage corresponding to the modulation component 47 or the original intelligence on the first carrier input 20.

Another improvement on my invention is the provision of the isolating rectifier 30. The action of the isolating rectifier 30 is to prevent interaction of the second carrier filter 33 on the first carrier filter 21.

In addition to the noise neutralizing properties, the system evidences a capacity for increasing the effective selectivity of the amplifier stage to which output it is connected, over and above the selectivity obtained by a combination of the same amplifier stage and a normal detector output. It is evident that this action results from the fact that those frequencies to which the sideband circuits present a high impedence cannot appear in the output. Thus the amplifier stage has an increased selectivity without increasing the length of the oscillatory wave train caused by high amplitude shock from interference noise energy.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of my invention as hereinafter claimed.

What is claimed is:

1. A radio circuit comprising, a source of intelligence modulated first carrier waves having superimposed thereon high peaks of interference, a first carrier wave filter having two input terminals, means for serially connecting said source with said two input terminals and two parallel paths of opposite sense, a source of second carrier waves having a maximum amplitude greater than the maximum amplitude of the intelligence component of said first carrier wave and less than the amplitude of said interference peaks, means for connecting into one of said paths said second carrier wave source for gating the conduction through said one path for thereby producing across said input terminals at said first carrier frequency a unipolarity voltage having at any instant an amplitude less than the amplitude of said second carrier wave and thus limiting said interference peaks to that amplitude, at least one parallel resonant circuit connected into the other of said paths and presenting a low impedance to the intelligence component of said first carrier wave thereby producing a negligible affect on said limiting action and presenting a high impedance to frequencies other than those of the intelligence sidebands for thereby producing across said input terminals a voltage of opposite polarity to said unipolarity voltage resulting in the reduction of the limited interference peaks, said first carrier wave filter having two output terminals, a load and a rectifier serially connected across said two output terminals with the rectifier connected in a sense so as to pass voltages of the polarity of said unipolarity voltage, and a second carrier filter connected across said load for removing said second carrier wave thereby producing across the output terminals of said second carrier wave filter said intelligence substantially free of said interference.

2. A radio circuit comprising a source of intelligence modulated first carrier waves having superimposed thereon high peaks of interference, a load and a detector serially connected with said source, circuit means passing current in only one direction, connection means for connecting said first circuit means in parallel with said series combination, second circuit means connected in parallel with said first circuit means for passing current in the opposite direction relative to said source, a voltage source serially connected in said first circuit means and having a maximum amplitude greater than the maximum amplitude of the intelligence component of said first carrier wave and less than the amplitude of said interference peaks, said detector and said first circuit means passing current in the same direction relative to said carrier wave source, said second circuit means including two parallel paths, one of which includes a first rectifier and a first parallel resonant circuit and the other including a second rectifier and a second parallel resonant circuit, said first and second rectifiers accomplishing said passage of current in said opposite direction, said first and second parallel resonant circuits having a resonant frequency higher and lower respectively than the frequency of said first carrier wave thereby presenting a low impedance to the intelligence component of said first carrier wave and presenting a high impedance to frequencies other than those of the intelligence sidebands for thereby producing across said load a voltage corresponding to said intelligence substantially free from said interference.

3. A circuit comprising a source of intelligence modulated carrier waves capable of having superimposed thereon interference energy, first and second parallel unidirectional paths of opposite sense, a load and a detector serially connected with said parallel paths, and means for injecting energy from said source into said series combination, said first path including discriminating means which are substantially only amplitude discriminating and said second path including discriminating means which are substantially only frequency discriminating, said detector and said first path passing current in the same direction relative to said source.

4. A circuit comprising a source of intelligence modulated carrier waves capable of having superimposed thereon interference energy, a load and a detector serially connected with said source, amplitude discriminating means passing current in only one direction, means for connecting said amplitude discriminating means in parallel with said series combination, said detector and said amplitude discriminating means passing current in the same direction relative to said source, frequency discriminating means including unidirectional means passing current in only one direction, and means for connecting said frequency discriminating means in parallel with said amplitude discriminating means to pass current in the opposite direction from said amplitude discriminating means relative to said source.

5. A circuit comprising a source of intelligence modulated first carrier waves having superimposed thereon high peaks of interference, a load and a detector serially connected with said source, amplitude discriminating circuit means passing current in only one direction, connection means for connecting said amplitude discriminating circuit means in parallel with said series combination, said detector and said circuit means passing current in the same direction relative to said source, frequency discriminating circuit means including unidirectional means passing current in one direction, and connection means for connecting said frequency discriminating circuit means in parallel with said amplitude discriminating circuit means to pass current in the opposite direction from said amplitude discriminating circuit means relative to said source thereby producing across said load a voltage corresponding to said intelligence substantially free from said interference.

6. A radio circuit comprising a source of intelligence modulated first carrier waves having superimposed thereon high peaks of interference, a load and a detector serially connected with said source, amplitude discriminating first circuit means passing current in only one direction, said detector and said first circuit means passing current in the same direction relative to said first source, connection means for connecting said first circuit means in parallel with said series combination, second circuit means connected in parallel with said first circuit means for passing current in the opposite direction relative to said source, and resonant circuit means connected in said second circuit means and presenting a given impedance to the intelligence component of said first carrier wave and presenting a relatively higher impedance to frequencies other than those of the intelligence sidebands for thereby producing across said load a voltage corresponding to said intelligence substantially free from said interference.

7. A radio circuit comprising a source of intelligence modulated first carrier waves having superimposed thereon high peaks of interference, a load and a detector serially connected with said source, first and second circuit means including first and second rectifiers respectively, first connection means for connecting said first circuit means in parallel with said first circuit means, said first and second rectifiers being oppositely connected relative to said source, said detector and said first circuit means passing current in the same direction relative to said first source, a voltage source serially connected in said first circuit means which voltage has a maximum amplitude greater than the maximum amplitude of the intelligence component of said first carrier wave and less than the amplitude of said interference peaks, and resonant circuit means serially connected in said second circuit means and presenting a low impedance to the intelligence component of said first carrier wave and presenting a high impedance to frequencies other than those of the intelligence sidebands for thereby producing across said load a voltage corresponding to said intelligence substantially free from said interference.

8. Apparatus for neutralizing the interference on a first carrier wave comprising, means for passing carrier half cycles of a first polarity, means for establishing a second carrier wave of a predetermined amplitude greater than the amplitude of said first carrier wave, means for combining said first and second carrier waves and passing voltages thereof of a second polarity, means for combining in opposition said passed voltages of first and second polarities, and means for selecting a voltage component representative of said combined voltages of a lower frequency than said carrier waves.

9. Apparatus for demodulating a first carrier wave comprising, means for passing carrier half cycles of a first polarity, means for establishing a second carrier wave of a predetermined amplitude greater than the amplitude of said first carrier wave and of a frequency less than that of said first carrier wave, means for combining said first and second carrier waves and passing voltages of a second polarity, means for combining in opposition said passed voltages of first and second polarities, and means for selecting a voltage component representative of said combined voltages of a lower frequency than said first carrier wave and at least as high a frequency as said second carrier wave.

10. Apparatus for neutralizing the interference on a first carrier wave comprising, means for passing carrier half cycles of a first polarity, means for establishing a second carrier wave of a predetermined amplitude greater than the amplitude of said first carrier wave and of a frequency less than that of said first carrier wave, means for combining said first and second carrier waves and passing voltages of a second polarity, means for combining in opposition said passed voltages of first and second polarities, means for selecting a voltage component representative of said combined voltages of a lower frequency than said first carrier wave and at least as high a frequency as said second carrier wave, and means for passing half cycles of said selected component of said second polarity.

11. Apparatus for neutralizing the high peaks of interference superimposed on an intelligence modulated first carrier wave comprising, means for passing carrier half cycles of a first polarity, means for establishing a second carrier wave of a predetermined amplitude greater than the amplitude of said first carrier wave and of a frequency less than that of said first carrier wave, means for combining said first and second carrier waves, means for passing voltages of a second polarity of said combined carriers, means for combining in opposition said passed voltages of first and second polarities, means for selecting a voltage component representative of said combined voltages of a frequency between that of said first and second carrier waves, means for passing half cycles of said selected component of said second polarity, and means for selecting an average voltage of a frequency less than that of said second carrier wave.

DONALD L. HINGS.

REFERENCES CITED

The following references are of record in the file of this patent:

UNITED STATES PATENTS

| Number | Name | Date |
|---|---|---|
| 2,029,354 | Bossart | Feb. 4, 1936 |
| 2,087,063 | McCutchen | July 13, 1937 |
| 2,088,210 | Koch | July 27, 1937 |
| 2,094,625 | Thompson | Oct. 5, 1937 |
| 2,103,878 | Thompson | Dec. 28, 1937 |
| 2,154,398 | Crosby | Apr. 11, 1939 |
| 2,172,476 | Koch | Sept. 12, 1939 |
| 2,185,612 | Trevor | Jan. 2, 1940 |
| 2,186,291 | Griffin | Jan. 9, 1940 |
| 2,228,084 | Murcek | Jan. 7, 1941 |
| 2,248,267 | Bacon | July 8, 1941 |
| 2,293,501 | Hansell | Aug. 18, 1942 |
| 2,312,070 | Bliss | Feb. 23, 1943 |
| 2,354,508 | Dome | July 25, 1944 |
| 2,363,288 | Bell | Nov. 21, 1944 |
| 2,394,544 | Gottier | Feb. 12, 1946 |